2,898,734
ROCKET PROPULSION METHOD

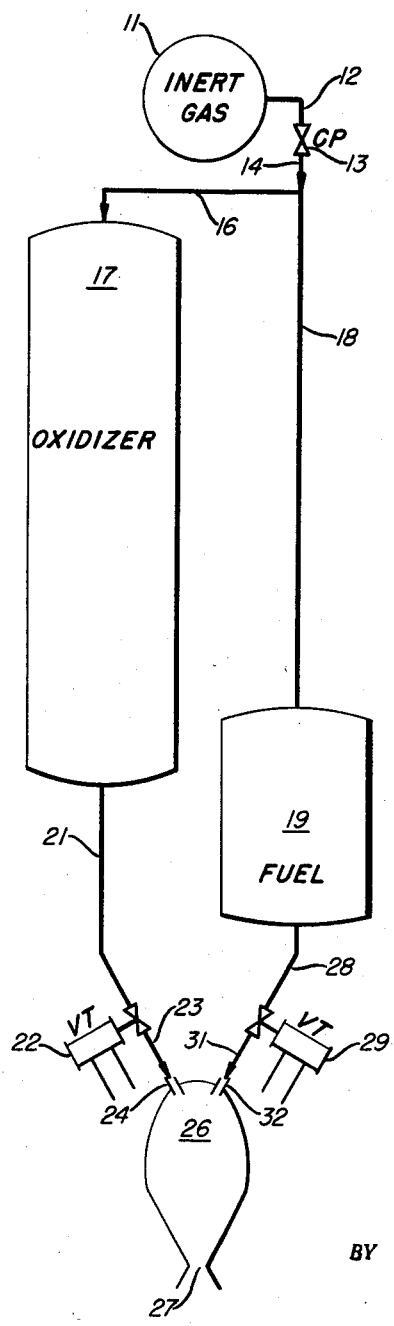

Don R. Carmody, Crete, Evan A. Mayerle, Chicago, and Alex Zletz, Park Forest, Ill., assignors to Standard Oil Company, Chicago, Ill., a corporation of Indiana Application September 16, 1953, Serial No. 380,453

10 Claims. (Cl. 60—35.4)

This invention relates to gas generation and rocket propulsion. More particularly the invention relates to a liquid rocket fuel which is suitable for use at very low atmospheric temperatures.

Bipropellant rockets have assumed a larger and larger place in the military and commercial fields both in missiles and in the assisted take-off of aircraft. In the bipropellant rocket a liquid fuel and a liquid oxidizer are injected separately and substantially simultaneously into the combustion chamber of the rocket motor; the fuel and oxidizer ignite hypergolically or are ignited by an external system such as a spark plug and burn to form a large volume of gases at high temperature; these gases are passed from the combustion chamber by way of an exit orifice.

A hypergolic fuel-oxidizer system is preferred because an auxiliary igniting system is thereby eliminated. In general the hypergolic activity of liquid fuels and nitric acid oxidizers decreases markedly with lowering of the temperature of the fuel and oxidizer. An air-to-air missile usually is exposed to the extreme cold of high altitudes for a period long enough to substantially attain atmospheric temperature. At the altitudes now commonly utilized by military aircraft, temperatures on the order of about $-65°$ F. are customary and $-100°$ F. is not uncommon.

Not only must the fuel have a melting point below about $-65°$ F., but also the fuel should have a viscosity low enough to flow readily through the fuel lines at very low atmospheric temperatures, i.e., about $-65°$ F. or lower.

More economical fuels which meet these severe requirements are desired in order to expand the field of usefulness of rocket-propelled vehicles.

It is an object of this invention to produce a rocket fuel which is suitable for use at very low atmospheric temperatures, i.e., below about $-65°$ F. Another object is a liquid rocket fuel which is suitable for use at very low atmospheric temperatures and which is less expensive than the presently known fuels. Still another object is a method of gas generation by the hypergolic reaction of a nitric acid oxidizer and a liquid rocket fuel at very low atmospheric temperatures. Yet another object is a method of rocket propulsion by the hypergolic reaction of the nitric acid oxidizer and a liquid rocket fuel at very low atmospheric temperatures.

These and other objects are attained by the use of a liquid fuel consisting essentially of between about 15 and about 85 volume percent of dialkyl disulfide and the remainder a trialkyl trithiophosphite, which alkyl groups contain not more than 2 carbon atoms. The preferred components of the fuel are dimethyl disulfide and trimethyl trithiophosphite.

The above liquid fuel is suitable for rocket propulsion even at low atmospheric temperatures when injected separately and substantially simultaneously into the combustion chamber of a rocket motor with a nitric acid oxidizer which may contain as much as 5 weight percent of non-acidic materials; for example, commercial grade white fuming nitric acid which usually contains 2–4% of water. By the use of nitric acid oxidizers such as red fuming nitric acid, a satisfactory hypergolic reaction is obtainable with the defined fuel at very low atmospheric temperatures, i.e., below about $-65°$ F.

The trithiophosphites are oxidized quite readily by atmospheric oxygen. Slight amounts of oxidation products have little adverse effect on the hypergolic activity of the composition of this invention. However, small amounts of oxidation products have an extremely deleterious effect on the viscosity of the composition and therefore suitable precaution should be taken to avoid prolonged exposure to the atmosphere at atmospheric temperature. However, it is intended that the term "trithiophosphite" shall also include slight amounts of these oxidation products.

The trithiophosphites may be made by the reaction of a mercaptan and phosphorus trichloride, in which case slight amounts of these materials may be present in the trithiophosphite product. When the trithiophosphite is made by the reaction of a disulfide and phosphorus, slight amounts of these materials may be present in the trithiophosphite product. The term "trithiophosphite" is intended to include the presence of slight amounts of material such as mercaptans, disulfides, etc.

The trithiophosphite component of the liquid rocket fuel of this invention is a trialkyl trithiophosphite, or mixtures thereof, wherein the alkyl group contains not more than 2 carbon atoms; for example, trimethyl trithiophosphite, methyl diethyl trithiophosphite, ethyl dimethyl trithiophosphite and triethyl trithiophosphite. The trithiophosphites of this invention are also definable as trialkyl trithiophosphites wherein the alkyl groups are selected from the class consisting of methyl and ethyl.

The disulfide component of the liquid rocket fuel of this invention is a dialkyl disulfide or mixtures thereof wherein the alkyl groups contain not more than 2 carbon atoms. The disulfide component may also be defined as a dialkyl disulfide wherein the alkyl groups are selected from the class consisting of methyl and ethyl. These disulfides are dimethyl disulfide, methyl ethyl disulfide and diethyl disulfide.

The most common method of preparing these disulfides is by the oxidation of the corresponding mercaptans. It is to be understood that the dialkyl disulfides may contain minor amounts of the corresponding mercaptan. Mercaptans are in themselves hypergolic with nitric acid oxidizers and the presence of mercaptans will not have any adverse effect on the hypergolic activity of the liquid fuel of this invention.

A rocket fuel consisting essentially of between about 15 and about 85 volume percent of the defined disulfide and the remainder, i.e., between about 85 and 15 volume percent of the defined trithiophosphite, is characterized by a melting point of about $-65°$ F. or lower, by a suitably short ignition delay with certain nitric acid oxidizers hereinafter defined, and by extreme fluidity at very low atmospheric temperatures. It is understood that an ignition delay of about 100 milliseconds is suitable for most rocket propulsion requirements. The ignition delay is defined as the time between the admixture of the fuel and the oxidizer and the initial appearance of a visible flame.

A superior rocket fuel for use at extremely low atmospheric temperatures on the order of about $-100°$ F. is obtained by a blend consisting essentially of between about 30 and about 70 volume percent of dimethyl disulfide and between about 70 and about 30 volume percent, i.e., the remainder, of trimethyl trithiophosphite, which fuel is characterized by a melting point below about $-100°$ F., very low viscosity and an ignition delay of below about 50 milliseconds. The defined fuel is used in rocket propulsion by separately and substantially simultaneously bringing together in the combustion chamber of the rocket motor the fuel and a nitric acid oxidizer to effect a hypergolic reaction and discharging the gaseous reaction products through an exit orifice. The reaction caused by the flow of the gases through the exit orifices drives the rocket in the opposite direction.

The rocket fuel composition of the invention is hypergolic at ordinary temperatures, i.e., about 75° F., with most nitric acid oxidizers. At temperatures on the order of —40° F. it is hypergolic with nitric acid oxidizers containing as much as 5 weight percent of non-acidic materials. These non-acidic materials may be water or pour point depressors such as potassium nitrite or sodium nitrate. At very low atmospheric temperatures such as —65° F., in order to get satisfactory ignition delays, the nitric acid oxidizers are selected from the class consisting of red fuming nitric acid, nitric acid-oleum mixtures and nitric acid-alkanesulfonic acid mixture. The nitric acid-oleum mixtures consist of white fuming nitric acid and oleum, for example, an 80:20 mixture. The nitric acid-alkanesulfonic acid mixtures may consist of mixtures of WFNA and methanesulfonic acid, ethanesulfonic acid, propanesulfonic acid, etc. It is preferred to use red fuming nitric acid containing at least about 16% of $N_2O_4$ as the oxidizer at very low temperatures. (It is to be understood that both the fuel and the nitric acid oxidizer are at the temperature mentioned as the initial temperature of operation.)

The hypergolic activity, viscosity and melting points obtainable with the liquid rocket fuel of this invention are shown in experimental tests set out below. The disulfides were essentially pure compounds. The trithiophosphites were prepared by the reaction of the corresponding disulfide and yellow phosphorus according to the method of U.S. Patent 2,542,370. A slight excess of disulfide was used in the preparation. The product trithiophosphite contained about 2 volume percent of disulfide and only a trace amount of elemental phosphorus.

*Test 1*

In this test the melting point of an essentially pure trimethyl trithiophosphite and of certain blends of dimethyl disulfide and trimethyl trithiophosphite, as prepared by the method described above, were determined. The melting point of the blend was determined because the fuel supercools very easily; and the solid fuel appears to be a glass rather than of a crystalline nature. The melting point was determined by freezing the sample of fuel by means of liquid nitrogen, in some cases seeding with a crystal of trithiophosphite was necessary, and then noting the temperature range over which the solid fuel melted. (The blends used consisted of an even amount of each component. The composition as set out herein has been corrected to take into account the disulfide present in the trithiophosphite reaction product.)

| Blend, Vol. Percent | | Melting Point, °F. |
|---|---|---|
| Dimethyl Disulfide | Trimethyl Trithiophosphite | |
| 0 | 100 | —74 to —64 |
| 21.6 | 78.4 | —105 to —84 |
| 31.4 | 68.6 | —114 to —98 |
| 80.4 | 19.6 | —171 to —132 |

These data indicate that a blend having a melting point of about —65° F. will contain about 15 volume percent of dimethyl disulfide and about 85 volume percent of trimethyl trithiophosphite.

*Test 2*

The melting point of essentially pure triethyl trithiophosphite was determined to be between —77° and —72° F.

*Test 3*

In this test the ignition delay of certain blends was determined at about room temperatures (+75° F.) using white fuming nitric acid containing about 2 weight percent water as the oxidizer. These ignition delays were determined in an apparatus which permitted the measurement of the ignition delay in milliseconds. This apparatus is designated as the CRC (photocell) apparatus. In this apparatus the ignition delay is determined as the time between the mixture of the fuel and the oxidizer and the instant at which the photocell notes the initial visible flash from the mixture; the apparatus has a delay in the absence of fuel and this fixed delay is subtracted from the recorded delay in order to determine the actual ignition delay of the fuel undergoing the test.

It has been noticed that the alkyl disulfides react hypergolically to produce a flame intensity much lower than that produced by the hypergolic reaction of a trialkyl trithiophosphite. It is indicated that owing to this low flame intensity the ignition delay obtained by this particular apparatus at high disulfide concentration is higher than that obtained by other apparatus not depending on a photocell pickup of the initial flame.

Hereinafter trithiophosphite is designated as "TP," triethyl trithiophosphite as "ETP" and trimethyl trithiophosphite as "MTP."

| Blend, Vol. percent | | Ignition Delay (+75° F.), milliseconds | |
|---|---|---|---|
| Disulfide | TP | Ethyl disulfide— ETP | Methyl disulfide— MTP |
| 0 | 100 | 18.9 | 9.3 |
| 11.8 | 88.2 | 28.2 | 18.0 |
| 21.6 | 78.4 | 47.1 | ---- |
| 31.4 | 68.6 | 57.5 | 17.6 |
| 41.2 | 58.8 | 86.3 | 19.7 |
| 51.0 | 49.0 | 101.0 | 23.4 |
| 60.8 | 39.2 | 78.4 | 28.6 |
| 70.6 | 29.4 | 62.9 | ---- |
| 80.4 | 19.6 | 52.1 | 33.1 |
| 90.2 | 9.8 | 51.7 | 30.2 |
| 100.0 | 0 | 110.0 | 118.0 |

It is particularly interesting that the dimethyl disulfide-trimethyl trithiophosphite blend showed only a very slight increase in delay until the blend contained more than 90 volume percent of the disulfide.

*Test 4*

Very low temperature tests were carried out on blends of dimethyl disulfide and trimethyl trithiophosphite. In these runs the nitric acid oxidizer was a red fuming nitric acid containing 22 weight percent of $N_2O_4$. The results of these runs are set out below. Once again this particular blend reacted peculiarly in that an abrupt change in hypergolic activity occurred when more than 90 volume percent of dimethyl disulfide was present in the blend. The term "no ignition" indicates that even though gas formation occurred upon admixture of the fuel and the oxidizer, no visible flame appeared. The data indicate that it is possible to operate at initial temperatures on the order of —100° F. by using a fuel consisting of between about 30 and about 70 volume percent of dimethyl disulfide and the remainder trimethyl trithiophosphite.

| Blend, Vol. percent | | Ignition Delay, milliseconds | |
|---|---|---|---|
| Disulfide | MTP | −65° F. | −80° F. |
| 0 | 100 | 7.9 | 12.9 |
| 21.6 | 78.4 | 19.9 | 29.7 |
| 41.2 | 58.8 | 17.8 | 31.3 |
| 60.8 | 39.2 | 30.9 | 41.5 |
| 80.4 | 19.6 | 32.8 | 60.5 |
| 90.2 | 9.8 | 47.0 | ---- |
| 95.1 | 4.9 | * N.I. | ---- |
| 100.0 | 0 | * N.I. | * N.I. |

* No ignition.

Test 5

The hypergolic activity of various mixtures of disulfides and trithiophosphites was observed at −65° F. using the 22% RFNA oxidizer. In each run the fuel consisted of a blend of 80.4 volume percent of disulfide and 19.6 volume percent of trithiophosphite. The results of these runs are given below.

| Blend Components | Ignition Delay (−65° F.), milliseconds |
|---|---|
| Methyl disulfide—Ethyl TP | 74.0 |
| Ethyl disulfide—Methyl TP | 68.0 |
| Methyl disulfide—Methyl TP | 32.8 |

These runs indicate a most surprising hypergolic activity of the methyl disulfide-trimethyl trithiophosphite blend as compared with blends containing ethyl groups in one of the components. In view of the fact that an ignition delay of 50 milliseconds or less is desired for military rockets, it is evident that the dimethyl disulfide-trimethyl trithiophosphite blend is a preferred fuel for use at very low atmospheric temperatures. It is to be understood that the ethyl component containing blends have ignition delays which make them suitable for many purposes since an ignition delay of 100 milliseconds is considered suitable for most rocket purposes.

Test 6

In this test the viscosity of essentially pure dimethyl disulfide, trimethyl trithiophosphite and certain blends of these two were determined at various temperatures.

| Fuel | Viscosity, centistokes | | |
|---|---|---|---|
| | +75° F. | −65° F. | −100° F. |
| MTP | 2.35 | 24.9 | 134 |
| Disulfide | 0.70 | 1.78 | 3.15 |
| 80% MTP 20% Disulfide | 1.54 | 13.53 | 42.39 |
| 20% MTP 80% Disulfide | 0.76 | 2.90 | 5.49 |

The viscosity of the trimethyl trithiophosphite at −100° F. shows the extent to which this compound can be supercooled without freezing. It is obvious from the melting point presented in Test 1 that trimethyl trithiophosphite cannot be expected to perform reliably at temperatures below about −65° F.

The data show that it is possible to obtain a fuel which is extremely fluid at temperatures on the order of −100° F. and which possesses very good hypergolic activity toward nitric acid oxidizers at these low temperatures.

In view of the extremely high viscosity of the supercooled trimethyl trithiophosphite at −100° F., it is remarkable that the blend containing 20 volume percent of this trithiophosphite should show a viscosity increase of only two units over the viscosity of the dimethyl disulfide itself.

The annexed figure which forms a part of this specification shows a schematic layout of the power plant of a bipropellant rocket utilizing a hypergolic fuel oxidizer system.

In the figure vessel 11 contains a quantity of gas at high pressure; this gas must be inert with respect to the oxidizer and the fuel; suitable gases are nitrogen and helium. Herein helium is used as the inert gas. Helium from vessel 11 is passed through line 12 and through valve 13 which regulates the flow of gas to maintain a constant pressure beyond valve 13. From valve 13 helium is passed through lines 14 and 16 into vessel 17 and simultaneously through line 18 into vessel 19.

Vessel 17 contains the oxidizer. Helium pressure forces the oxidizer out of vessel 17 through line 21 to valve 22. Valve 22 is a solenoid actuated throttling valve. Suitable electrical lines connect valve 22 to an electrical source and operating switch (not shown) at the control panel of the aircraft. The oxidizer is passed through line 23 and injector 24 into combustion chamber 26. Combustion chamber 26 is provided with an outlet nozzle 27.

Vessel 19 contains the fuel. Vessels 17 and 19 are constructed to withstand the high pressure imposed by the helium gas. The gas pressure forces fuel from vessel 19 through line 28 to solenoid actuated throttling valve 29. Valve 29 is similar in construction and in actuation to valve 22. The fuel is passed through line 31 and injector 32 into combustion chamber 26.

Valves 22 and 29 are of such a size and setting that a predetermined ratio of oxidizer-to-fuel is passed into combustion chamber 26. Injectors 24 and 32 are so arranged that the streams of oxidizer and fuel converge and contact each other forcibly, resulting in a very through intermingling of the fuel and the oxidizer.

The missile is launched by activating the solenoids on valves 22 and 29. In this illustration 4.5 lbs. of 22% RFNA are introduced into combustion chamber 26 per pound of fuel. Herein the fuel consists of 65 volume percent of trimethyl trithiophosphite and 35 volume percent of dimethyl disulfide. The oxidizer and the fuel react almost instantaneously upon contact in the combustion chamber; a large volume of very hot gas is produced in the combustion chamber, which gas escapes through orifice 27. The reaction from this expulsion of gas drives the missile toward its target.

Thus having described the invention, what is claimed is:

1. A method of rocket propulsion, which method comprises bringing together separately and substantially simultaneously into the combustion chamber of a rocket motor a nitric acid oxidizer and a liquid fuel to effect a hypergolic reaction and discharging gaseous reaction products through an exit orifice wherein said liquid fuel consists essentially of between about 15 and about 85 volume percent of a dialkyl disulfide which disulfide alkyl groups contain not more than 2 carbon atoms and the remainder a trialkyl trithiophosphite, which trithiophosphate alkyl groups contain not more than two carbon atoms.

2. The method of claim 1 wherein said trithiophosphite is trimethyl trithiophosphite.

3. The method of claim 1 wherein said trithiophosphite is triethyl trithiophosphite.

4. The method of claim 1 wherein said disulfide is dimethyl disulfide.

5. The method of claim 1 wherein said disulfide is diethyl disulfide.

6. A method of rocker propulsion, which method comprises bringing together separately and substantially simultaneously into the combustion chamber of a rocket motor a nitric acid oxidizer and a liquid fuel to effect a hypergolic reaction and discharging gaseous reaction products through an exit orifice wherein said liquid fuel consists essentially of between about 15 and about 85 volume percent of dialkyl disulfide selected from the class consisting of dimethyl disulfide and diethyl disulfide and the remainder trialkyl trithiophosphite selected from the class consisting of trimethyl trithiophosphite and triethyl trithiophosphite.

7. A method of rocket propulsion suitable for use at very low atmospheric temperatures, which method comprises injecting separately and substantially simultaneously into the combustion chamber of a rocket motor to effect a hypergolic reaction, a nitric acid oxidizer consisting of red fuming nitric acid containing at least about 16% of $W_2O_4$ and a liquid rocket fuel consisting essentially of between about 30 and about 70 volume percent of dimethyl disulfide and between about 70 and about 30 volume percent of trimethyl trithiophosphite and discharging gaseous reaction products through an exit orifice.

8. A composition consisting essentially of between about 15 and about 85 volume percent of a dialkyl disulfide wherein said disulfide alkyl groups contain not more than 2 carbon atoms and between about 85 and about 15 volume percent of a trialkyl trithiophosphite wherein said trithiophosphite alkyl groups contain not more than 2 carbon atoms.

9. A composition consisting essentially of between about 30 and about 70 volume percent of dimethyl disulfide and between about 70 and about 30 volume percent of trimethyl trithiophosphite.

10. A method of rocket propulsion suitable for use at very low atmospheric temperatures, which method comprises injecting separately and substantially simultaneously into the combustion chamber of a rocket motor to effect a hypergolic reaction, a nitric acid oxidizer, wherein said nitric acid oxidizer consists of about 80% of white fuming nitric acid and about 20% of oleum, and a liquid rocket fuel consisting essentially of between about 30 and about 70 volume percent of dimethyl disulfide and between about 70 and about 30 volume percent of trimethyl trithiophosphite and discharging gaseous reaction products through an exit orifice.

References Cited in the file of this patent

UNITED STATES PATENTS

| | | |
|---|---|---|
| 2,261,227 | Cloud | Nov. 4, 1941 |
| 2,382,905 | Pedersen et al. | Aug. 14, 1945 |
| 2,542,370 | Stevens et al. | Feb. 20, 1951 |
| 2,557,018 | Viies | June 12, 1951 |
| 2,573,471 | Malina et al. | Oct. 30, 1951 |

OTHER REFERENCES

Journal of the American Rocket Society, No. 72, Dec. 1947, pages 17, 32–35.